United States Patent
Cook et al.

(10) Patent No.: US 6,788,116 B1
(45) Date of Patent: Sep. 7, 2004

(54) LOW VOLTAGE DIFFERENTIAL SWING (LVDS) SIGNAL DRIVER CIRCUIT WITH LOW PVT SENSITIVITY

(75) Inventors: Richard W. Cook, E. Waterboro, ME (US); Stephen J. O'Brien, Scarborough, ME (US); Roy L. Yarbrough, Hiram, ME (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/205,853

(22) Filed: Jul. 26, 2002

(51) Int. Cl.$^7$ ................................................ H03B 1/00
(52) U.S. Cl. .......................... 327/108; 327/109; 326/82
(58) Field of Search ................................ 327/108, 198; 326/30, 82, 83, 86, 87, 88, 89, 90; 345/204

(56) References Cited

U.S. PATENT DOCUMENTS

| | | | | |
|---|---|---|---|---|
| 6,118,438 A | * | 9/2000 | Ho | 345/204 |
| 6,201,405 B1 | * | 3/2001 | Hedberg | 326/30 |
| 6,411,146 B1 | * | 6/2002 | Kuo | 327/198 |
| 6,429,700 B1 | * | 8/2002 | Yang | 327/108 |
| 6,617,888 B2 | * | 9/2003 | Volk | 327/67 |
| 6,661,288 B2 | * | 12/2003 | Morgan et al. | 330/258 |

* cited by examiner

*Primary Examiner*—Tuan T. Lam
*Assistant Examiner*—Hiep Nguyen
(74) *Attorney, Agent, or Firm*—Vedder Price Kaufman & Kammholz, P.C.

(57) ABSTRACT

A low voltage differential swing (LVDS) signal driver having a constant output differential voltage (Vod) over variations in circuit fabrication processes, power supply voltages and operating temperatures (PVT). The minimum and maximum values of the LVDS output signal are monitored and, based upon the difference between them, a signal is provided to the circuit to control the LVDS output signal such that its peak-to-peak value is maintained at a determined value.

12 Claims, 1 Drawing Sheet

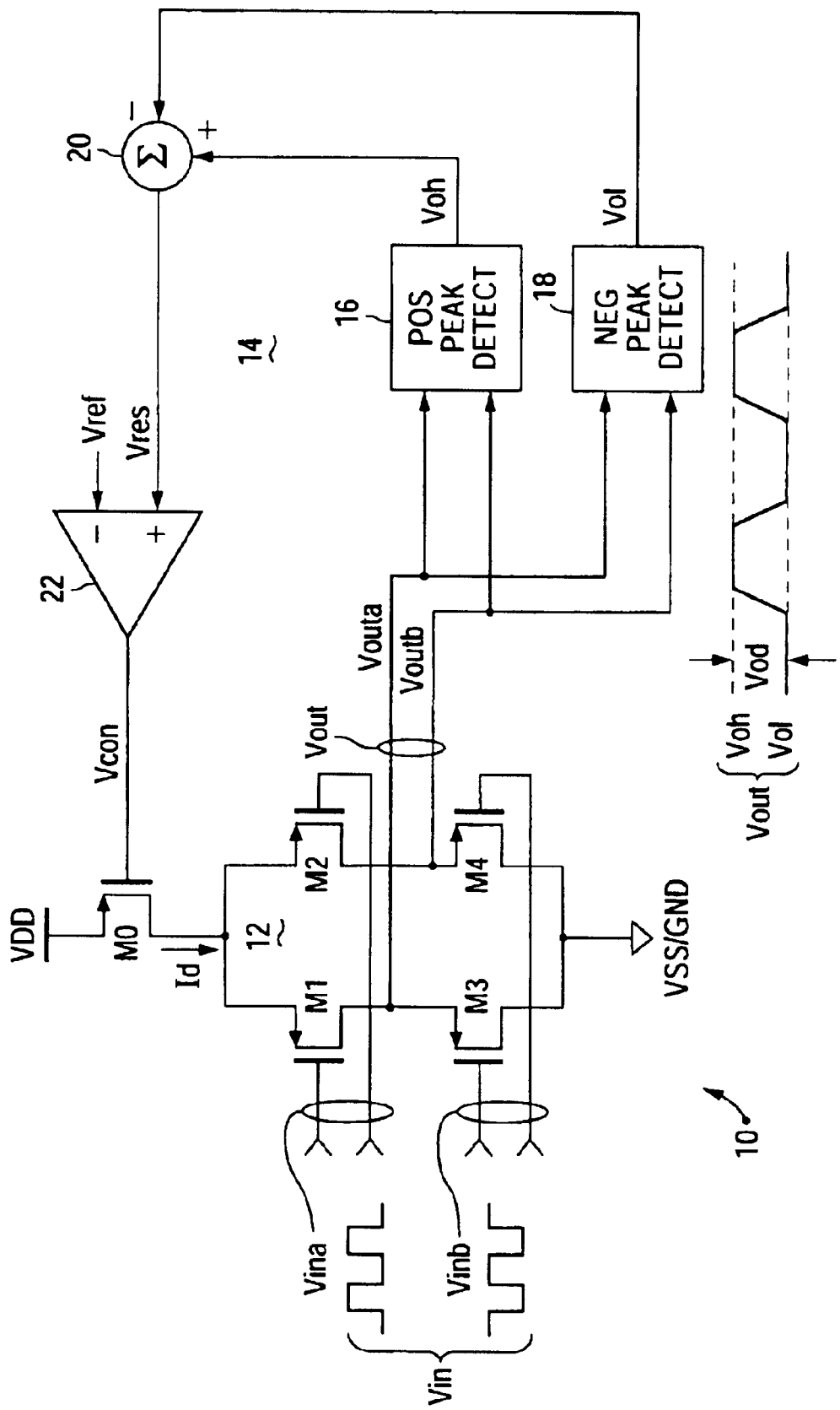

LOW VOLTAGE DIFFERENTIAL SWING (LVDS) SIGNAL DRIVER CIRCUIT WITH LOW PVT SENSITIVITY

BACKGROUND OF THE INVENTION

1. Field of the Invention

The present invention relates to high speed digital integrated circuits, and in particular, to low voltage differential swing (LVDS) signal drivers for uses in and with high speed digital integrated circuits.

2. Description of the Related Art

With the tremendous growth of the Internet, data transfers, in terms of both volume and speed, are increasing dramatically in all areas of communications. For example, data streams for digitized video signals, high definition television (HDTV) and color graphics data require increasing amounts of bandwidth. As a result, increasingly higher speed interconnects between integrated circuits (chips), functional boards and systems become increasingly critical. While virtually all such data is digital in form, it is a high speed analog circuit technique that has become increasingly prevalent in meeting such data transfer needs. This circuitry, i.e., LVDS, provides for multigigabit data transfers on copper interconnects and high speed transmission lines, including fiber optic applications. These LVDS circuits have proven speed, low power, noise control and cost advantages important in point-to-point applications for telecommunications, data communications and video displays.

However, while LVDS circuits continue to provide significant advantages in applications requiring high data transfer rates, such circuits are not immune from three major parameters that influence the operation of virtually any circuit or system: circuit fabrication (or manufacture) process variations ("P"); power supply voltage variations ("V"); and operating temperature variations ("T"); often referred to collectively as PVT.

With respect to fabrication process variations, it is well known that notwithstanding the stringent quality control measures typically used to fabricate integrated circuits, fabrication processes nonetheless suffer some variations among the various processing parameters.

With respect to power supply variations, it is well known that notwithstanding the use of various filters or shielding techniques, noise and especially low frequency noise can be present or induced in the power supply line (e.g, switching noise, electromagnetic interference, etc.). Power supply noise can cause jitter on the rising and falling edges of the signal being processed, as well as frequency skew within the output signal.

With respect to operating temperature variations, such variations will virtually never be avoidable, as operating temperatures can vary due to a number of causes, including variations in data transfer rates, ambient temperature, variations in power supply voltage, among others. As operating temperatures vary, so can the amplitude, phase and frequency of some of the signals being processed.

SUMMARY OF THE INVENTION

A low voltage differential swing (LVDS) signal driver in accordance with the presently claimed invention maintains a constant output differential voltage (Vod) over variations in circuit fabrication processes, power supply voltages and operating temperatures (PVT). The minimum and maximum values of the LVDS output signal are monitored and, based upon the difference between them, a signal is provided to the LVDS circuit to control the LVDS output signal such that its peak-to-peak value is maintained at a predetermined value.

In accordance with one embodiment of the presently claimed invention, a low voltage differential swing (LVDS) signal driver includes differential signal driver circuitry and feedback circuitry. The differential signal driver circuitry receives a control signal and in response thereto receives and converts a dual differential input signal to a LVDS signal having minimum and maximum values. The feedback circuitry, coupled to the differential signal driver circuitry, receives the LVDS signal and in response thereto provides the control signal, wherein a difference between the minimum and maximum LVDS signal values is maintained at a predetermined value.

In accordance with another embodiment of the presently claimed invention, a low voltage differential swing (LVDS) signal driver includes signal driver means and feedback means. The signal driver means is for receiving a control signal and in response thereto receiving and converting a dual differential input signal to a LVDS signal having minimum and maximum values. The feedback means is for receiving the LVDS signal and in response thereto providing the control signal and maintaining a difference between the minimum and maximum LVDS signal values at a predetermined value.

In accordance with still another embodiment of the presently claimed invention, a method for generating a low voltage differential swing (LVDS) signal driver includes:

receiving a control signal;

receiving a dual differential input signal;

converting the dual differential input signal to a LVDS signal having minimum and maximum values in response to the control signal; and generating the control signal in response to the LVDS signal and thereby maintaining a difference between the minimum and maximum LVDS signal values at a predetermined value.

BRIEF DESCRIPTION OF THE DRAWING

The FIGURE is a schematic diagram of a LVDS Signal Driver in accordance with one embodiment with a presently claimed invention.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal.

Referring to the FIGURE, an LVDS Signal Driver Circuit 10 (preferably in integrated circuit form) in accordance with one embodiment of the presently claimed invention includes a differential signal driver circuit 12 and feedback circuitry 14 which, as discussed in more detail below, controls the signal driver circuit 12 in such a manner as to provide an output signal voltage Vout, in which the peak-to-peak differential signal amplitude Vod is maintained at a substantially constant value (e.g., approximately 350 millivolts) notwithstanding PVT variations.

The LVDS driver circuitry 12 includes P-type metal oxide semiconductor field effect transistors (P-MOSFETs) M0, M1, M2, M3 and M4, all interconnected substantially as shown. In accordance with well known LVDS circuit principles, transistors M1, M2, M3 and M4 form the output signal "switchbox" with differential pair transistors M1 and M2 receiving the primary differential phase Vina and differential pair transistors M3 and M4 receiving the inverse differential phase Vinb of the input signal Vin. (It should be understood that while this driver circuitry 12 has been implemented using P-MOSFETs exclusively, similar circuitry can be implemented using N-MOSFETs exclusively or a complementary arrangement of P- and N-MOSFETs.) Transistor M0 serves as a tail current source for the driver current Id flowing between the positive power supply terminal VDD and the negative power supply terminal VSS/GND. This transistor M0 is biased, or controlled, by a control voltage Vcon which, as discussed in more detail below, establishes and maintains the driver current Id such that the output signal Vout is maintained at the desired amplitude Vod notwithstanding PVT variations.

The feedback circuitry 14 includes signal peak detection circuits 16, 18, a signal combiner (e.g., summer) 20 and a voltage comparison circuit 22, all interconnected substantially as shown.

In accordance with well known LVDS circuit principals, the interconnected drain and source terminals of transistors M1 and M3 and transistors M2 and M4 provide the differential output signal Vout. The gate terminals of transistors M1 and M2 receive the primary ("positive") differential signal phase Vina and the gate terminals of transistors of M3 and M4 receive the inverse ("negative") differential signal phase Vinb of the input signal Vin. When transistors M1 and M4 are turned on, transistors M2 and M3 are turned off, while conversely when transistors M2 and M3 are turned on, transistors M1 and M4 are turned off. Accordingly, the driver current Id is steered through an external load resister (not shown) to produce the output voltage Vout.

The differential signal components Vouta and Voutb of the output signal Vout are processed by the signal peak detection circuits 16, 18. The positive peak detection circuit 16 detects the maximum (e.g., most positive or least negative) signal value of the output signal Vout and provides an output signal Voh indicative of that value. Similarly, the negative peak detection circuit 18 detects the minimum (e.g., most negative or least positive) signal value of the output signal Vout and provides an output signal Vol indicative of that value.

The signal combiner circuitry 20 differentially sums these detection signals Voh, Vol by subtracting the minimum value detection signal Vol from the maximum value detection signal Voh and provides a resultant, or difference, signal Vres indicative of the difference between these two signals Voh, Vol.

This resultant signal Vres is compared against a reference signal Vref in the signal comparison circuitry 22. As a result of this comparison, the control signal Vcon is generated to indicate the difference between the resultant signal Vres and the reference Vref.

In accordance with the foregoing discussion, the feedback circuitry 14 monitors the output LVDS signal Vout and, through the feedback control signal Vcon, establishes and maintains the driver current Id such that the amplitude Vod of the output signal Vout is maintained notwithstanding PVT variations, as well as variations in the external load (not shown) through which the driver current Id flows.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a low voltage differential swing (LVDS) signal driver, comprising:

differential signal driver circuitry that receives a control signal and in response thereto receives and converts a dual differential input signal to a LVDS signal having minimum and maximum peak signal values; and feedback circuitry, coupled to said differential signal driver circuitry, that receives said LVDS signal and in response thereto provides said control signal, wherein a difference between said minimum and maximum peak signal value, is maintained at a predetermined value;

wherein said feedback circuitry comprises signal peak detection circuitry that receives said LVDS signal and in response thereto provides first and second detected peak signals representing said minimum and maximum peak signal values, and control circuitry, coupled to said signal detection circuitry, that receives said first and second detected peak signals and in response thereto provides said control signal.

2. The apparatus of claim 1, wherein said signal peak detection circuitry comprises first and second peak signal detectors that detect said minimum and maximum peak signal values and in response thereto provides said first and second detected peak signals.

3. The apparatus of claim 1, wherein said control circuitry comprises signal combining circuitry that receives and differentially combines said first and second detected peak signals to provide a difference signal.

4. The apparatus of claim 3, wherein said control circuitry further comprises signal comparison circuitry, coupled to said signal combining circuitry, that receives and compares a reference signal and said difference signal and in response thereto provides said control signal.

5. The apparatus of claim 1, wherein said differential signal driver circuitry comprises:

current source circuitry that receives said control signal and in response thereto provides a driver current; and differential amplifier circuitry, coupled to said current source circuitry, that receives said dual differential input signal and in response thereto selectively conducts said driver current to produce said LVDS signal.

6. An apparatus including a low voltage differential swing (LVDS) signal driver, comprising:

signal driver means for receiving a control signal and in response thereto receiving and converting a dual differential input signal to a LVDS signal having minimum and maximum peak signal values; and feedback means for receiving said LVDS signal and in response thereto providing said control signal and maintaining difference between said minimum and maximum peak signal values at a predetermined value;

wherein said feedback means comprises peak detector means for detecting said LVDS signal and providing first and second detected peak signals representing said minimum and maximum peak signal values, and controller means for receiving said first and second detected peak signals and in response thereto providing said control signal.

7. The apparatus of claim 6, wherein said signal driver means comprises:

current sourcing means for receiving said control signal and in response thereto providing a driver current; and amplifier means for receiving said dual differential input signal and in response thereto selectively conducting said driver current and producing said LVDS signal.

8. A method for generating a low voltage differential swing (LVDS) signal driver, comprising:

receiving a control signal;

receiving a dual differential input signal;

converting said dual differential input signal to a LVDS signal having minimum and maximum peak signal values in response to said control signal; and generating said control signal in response to said LVDS signal and thereby maintaining a difference between said minimum and maximum peak signal values at a predetermined value by generating, in response to said LVDS signal, first and second detected peak signals representing said minimum and maximum peak signal values, and generating said control signal in response to said first and second detected peak signals.

9. The method of claim 8, wherein said generating, in response to said LVDS signal, first and second detected peak signals representing said minimum and maximum peak signal values comprises:

detecting said minimum and maximum peak signal values; and generating, in response to said detection, said first and second detected peak signals.

10. The method of claim 8, wherein said generating said control signal in response to said first and second detected peak signals comprises generating, in response to a difference between said first and second detected peak signals, a difference signal as said at least one resultant signal.

11. The method of claim 10, wherein said generating said control signal in response to said at least one resultant signal comprises:

receiving a reference signal;

comparing said reference signal and said difference signal; and generating said control signal in response to said comparison.

12. The method of claim 8, wherein said converting said dual differential input signal to a LVDS signal having minimum and maximum peak signal values in response to said control signal comprises:

generating a driver current in response to said control signal; and selectively conducting said driver current in response to said dual differential input signal to produce said LVDS signal.

\* \* \* \* \*

UNITED STATES PATENT AND TRADEMARK OFFICE
CERTIFICATE OF CORRECTION

PATENT NO. : 6,788,116 B1
DATED : September 7, 2004
INVENTOR(S) : Cook et al.

It is certified that error appears in the above-identified patent and that said Letters Patent is hereby corrected as shown below:

Column 3,
Line 38, please delete "principals" and replace with -- principles --.

Column 4,
Line 33, please delete "value," and replace with -- values --.

Signed and Sealed this

Seventh Day of December, 2004

JON W. DUDAS
*Director of the United States Patent and Trademark Office*